June 22, 1965 B. B. BECKER ETAL 3,190,994
CAM-ACTUATED CONTROL SWITCH MOUNTING
FOR MOTORIZED LIFT TRUCK
Filed Oct. 31, 1963 4 Sheets-Sheet 1
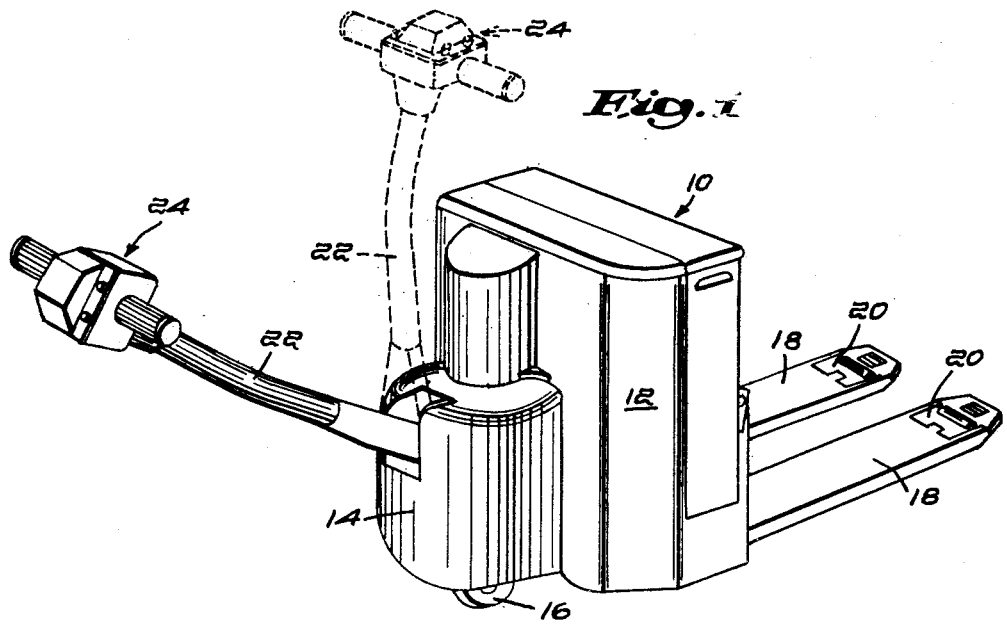
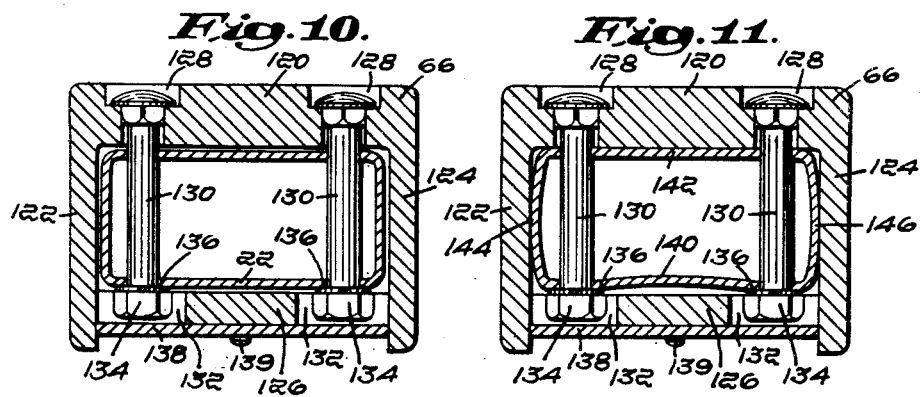
Inventors:
Bernard B. Becker,
Francis W. Dorion,
by Russell, Chittick & Pfund
Attorneys

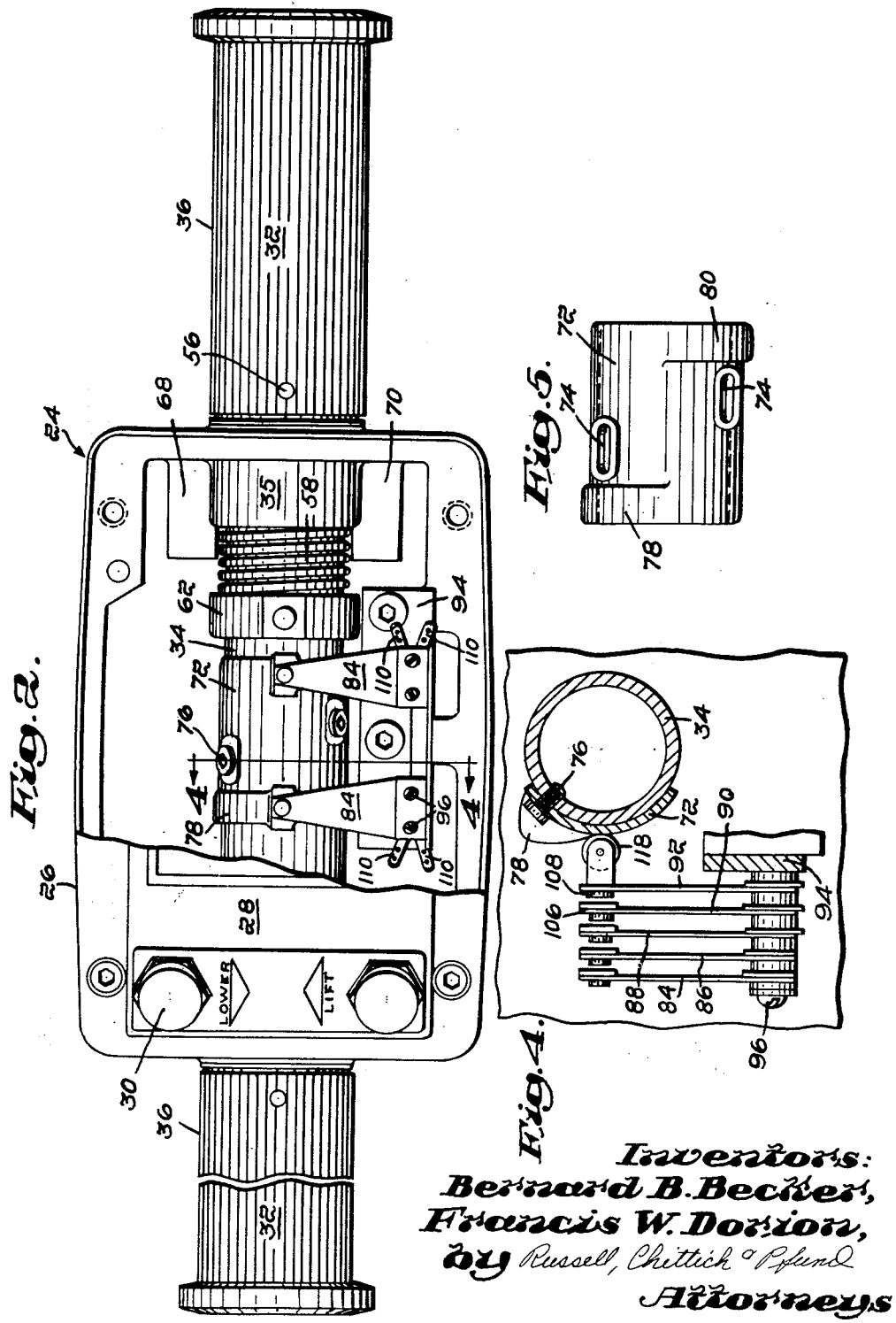

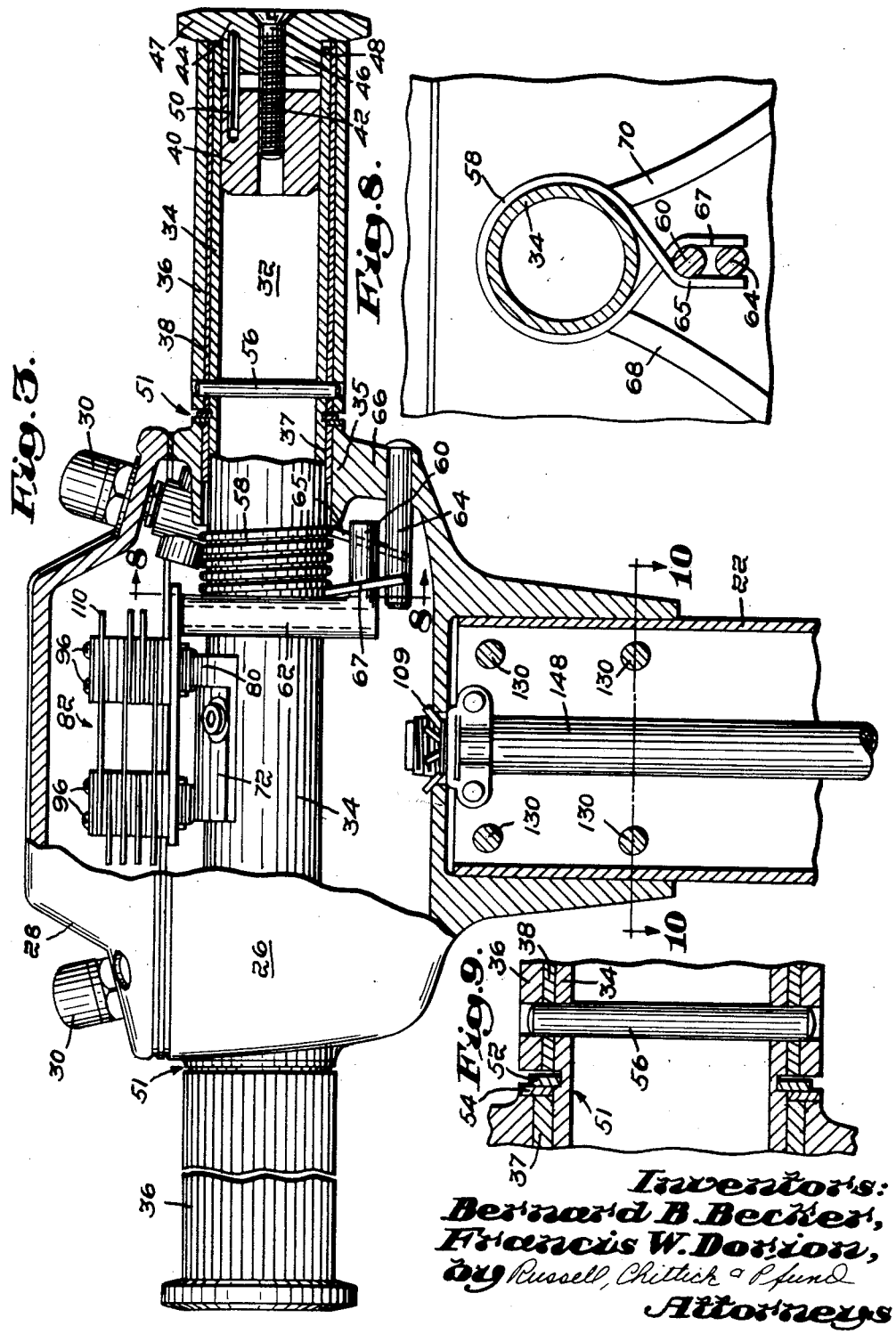

June 22, 1965
B. B. BECKER ETAL
3,190,994
CAM-ACTUATED CONTROL SWITCH MOUNTING
FOR MOTORIZED LIFT TRUCK
Filed Oct. 31, 1963
4 Sheets-Sheet 4
*Fig. 6.*
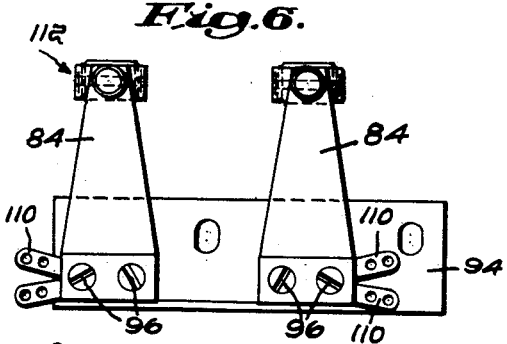
*Fig. 7a.*     *Fig. 7.*
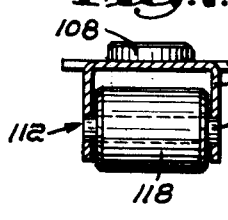 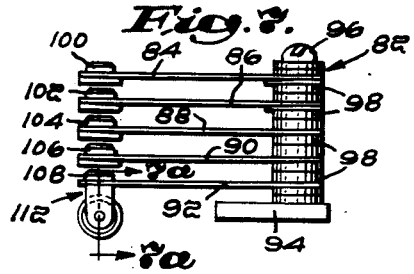
*Fig. 12.*
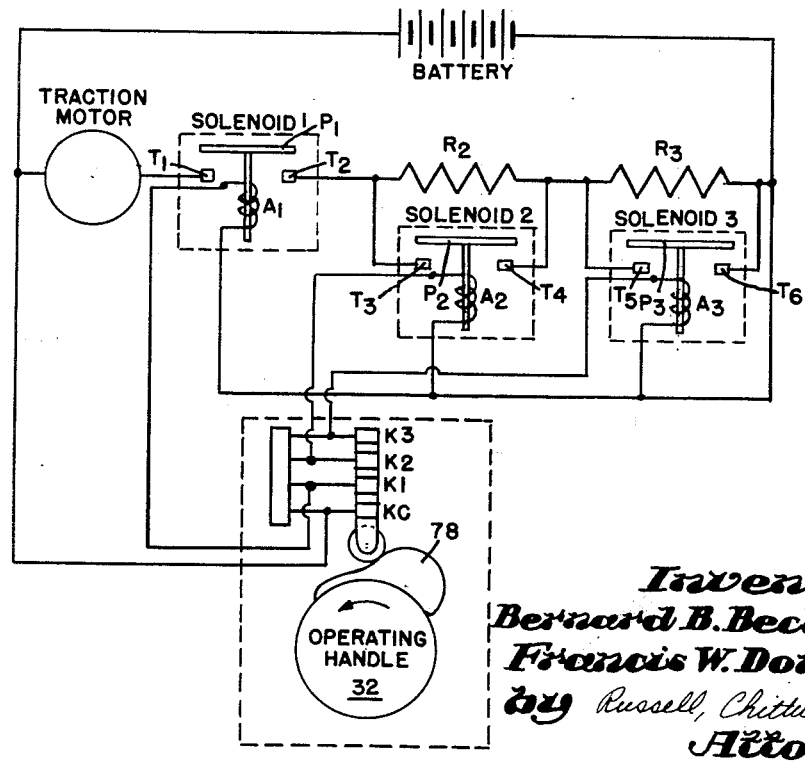
Inventors:
Bernard B. Becker,
Francis W. Dorion,
by Russell, Chittick & Pfund
Attorneys 3,190,994
CAM-ACTUATED CONTROL SWITCH MOUNTING
FOR MOTORIZED LIFT TRUCK
Bernard B. Becker, Belmont, and Francis W. Dorion, South Boston, Mass., assignors to Lewis-Shepard Company, Watertown, Mass., a corporation of Massachusetts
Filed Oct. 31, 1963, Ser. No. 320,275
4 Claims. (Cl. 200—157)

This invention relates to an improved control handle for operating a materials handling truck and more particularly to a control handle which is remotely mounted on an extension of the materials handling truck to permit operation of the truck by an operator who is walking rather than riding on the truck.

Materials handling trucks that are used to move palletized loads are generally of two types: (1) those driven by an operator seated on the truck who uses an automotive type steering wheel and foot pedal controls, and (2) those driven by an operator, who walks at the front of the truck, who drives and steers with a control unit mounted on the end of a movable forwardly extending steering bar.

The latter, so-called "walking truck" is particularly useful for maneuvering loaded pallets in confined areas, such as narrow aisles. This is because walking trucks are considerably smaller in size since no provision need be made for seating an operator thereon.

An important problem encountered in constructing a control handle for walking type trucks is to conveniently provide the operator with simplified controls to manipulate the lifted load, such as "lift," "lower," "tilt in," "tilt out," as well as controls for selecting the truck travel speed, both forward and reverse.

All these motor-driven activities require instantaneous operator control which in turn requires that the control buttons be located to facilitate instantaneous manipulation by the operator. Furthermore, since the operator has but two hands, it is highly desirable that several of the controls be duplicated so as to be operable with either hand.

A requirement relating to safety is that accidental or intentional release of the control handle by the operator should activate safeguards which prevent the truck from running away or from other accidental uncontrolled equipment operation.

It is therefore an object of this invention to provide a control handle for use with materials handling trucks which will provide an operator with fingertip control over all load movement and truck travel operations.

It is another object of this invention to provide a control handle that has a rotating grip which can be operated with either hand to provide precise operator control over a plurality of forward and reverse truck travel speeds.

Another object of this invention is to provide a control handle for materials handling trucks which, when released, will positively halt all motor driven functions in the manner of a "dead man" brake.

It is a further object of this invention to provide a control handle for materials handling trucks which has shear sections in the handle grip constructed so that a portion of the grip will be sheared off upon forcefully striking an obstruction thereby protecting the control handle housing. This provision prevents damage to the electrical switching mechanisms mounted within the control handle housing and prevents the speed controls from being jammed in the "on" or drive" positions.

Other objects and advantages of the invention will become apparent from a study of the accompanying drawings and descriptive matter in which is illustrated and described a preferred embodiment of the invention.

In the drawings:
FIG. 1 is a view in perspective of the materials handling truck showing the control handle in its lower or use position, and with its upper, or brake position shown in phantom;
FIG. 2 is a plan view of the control handle with the top portion of the casing partially broken away to expose the internal motor control switching mechanism;
FIG. 3 is a front elevation of the control handle shown in FIG. 2 with a portion of the side casing partially broken away and with the operating handle further broken away to show its detailed construction;
FIG. 4 is a view in section taken along line 4—4 of FIG. 2 showing the bank of blade switches being contacted by the cam shoulder;
FIG. 5 is a plan view of the cam plate shown bolted to the operating handle inner shaft;
FIG. 6 is a plan view of the bank of blade switches;
FIG. 7 is an end elevation of the bank of blade switches shown in FIG. 6;
FIG. 7a is a view in section taken along line 7a—7a of FIG. 7 showing the cam roller in detail;
FIG. 8 is a view in section taken along line 8—8 of FIG. 3 showing the coiled return spring and its associated retaining means;
FIG. 9 is an enlarged view of the shear area of the operating handle shown in FIG. 3;
FIG. 10 is a view in section taken along line 10—10 of FIG. 3 showing the steering bar in assembly with the lower portion of the control handle casing before the securing nuts are tightened;
FIG. 11 is a view in section of the assembly shown in FIG. 10 taken after the nuts are tightened to rigidly secure the control handle casing to the steering bar; and
FIG. 12 is a simplified schematic wiring diagram of the traction motor speed control.

Referring now more particularly to FIG. 1 of the drawings, the materials handling truck generally designated as 10 will be recognized as being conventional in several respects. The truck has a main housing 12 enclosing the lifting machinery, the batteries, and other mechanical elements necessary to power the materials handling truck. The traction drive unit is housed at 14 and includes the gear train and braking system. In the walking type of truck shown in FIG. 1, a single driven steerable wheel 16 is employed to provide maximum maneuverability. Extending to the rear of the truck is a pair of spaced apart fork extensions 18 specially shaped for insertion into open faced pallets and skid platforms. Fork wheels 20, which are recessed into the fork extensions 18, provide rolling support for the fork extensions. Fork wheels 20 are also adapted to be pivoted downwardly by means of a piston-operated linkage arrangement in order to horizontally raise the fork extensions. The downward pivoting of the fork wheels raises the loaded pallet or skid into which the fork extension 18 have been inserted so that the loaded truck can be driven to another location for unloading.

Steering bar 22 is rigidly connected to the mounting means of steerable rear wheel 16 so that the wheel can be steered by the bar. Steering bar 22 is also pivoted vertically so as to be movable between the use and brake positions shown in FIG. 1.

Mounted on the upper end of steering bar 22 is a control handle generally designated as 24 which is the primary subject of this invention. Control handle 24 is adapted to be handle-held by the operator as he walks or stands before the material handling truck in order to steer the truck and control its loading and unloading activities plus selectively determining the travel speed of the truck.

The construction of the truck as just described is well known in the art and the particular means by which the truck is operated to perform its loading and unloading functions is conventional and does not in any way form a part of the present invention. Accordingly, it is not necessary to set forth the construction thereof in detail; as will appear, the control handle is independently constructed and can be utilized with various types of materials handling trucks. It should be noted that the type of truck shown in FIG. 1 has been selected for illustrative purposes only and is not the only type of truck that can be operated by means of the described control handle 24.

Referring now to FIG. 2, control handle 24 is shown with its control handle casing 26 partially broken away to expose the internal switching components. Control handle casing 26 has mounted on its top surface 28 a plurality of control buttons 30 for selectively controlling the various loading and unloading activities of the truck. The normal complement of control buttons 30 includes lower, lift, tilt in, tilt out, and horn. Control buttons for other mechanical features can be substituted for or added to those just mentioned. It is important to note that these buttons are positioned adjacent the lateral edge portions of top casing surface 28 so as to be convenient for fingertip activation by the operator.

Extending transversely through the control handle casing 26 is operating handle 32 which protrudes a sufficient distance to either side of casing 26 to accommodate an operator's hands. Operating handle 32 is provided with an inner shaft 34 which is mounted for rotation in bearing surfaces 37 within shaft housings 35. The shaft housings are integral with and extend inwardly from the side walls of control handle casing 26. Grooved hand grips 36, bonded to backing cylinders 38 are fitted over the portions of inner shaft 34 which extend outside of control handle casing 26.

Anchor plugs 40, cylindrical in shape, are pressed or force fitted into each end of hollow inner shaft 34 and are immovable therein. Anchor plugs 40 have an axial threaded bore 42. Grip ends 44 are cylindrically shaped each with a body portion 46 and a larger diameter external shoulder 47. The body portion 46 is dimensioned to closely fit within operating handle inner shaft 34 and external shoulder 47 fits flush against hand grip 36. Grip end 44 is centrally bored and countersunk to receive a retaining bolt 48 which is threadably secured in axial bore 42 of anchor plug 40. Anchor plug 40 and grip end 44 both have mating longitudinal off-center recesses adapted to receive pin 50 to prevent rotational movement therebetween. A locking pin 56 is transversely located through the entire operating handle assembly as a final locking provision. Therefore, it will be seen that the operating handle 32, including hand grips 36, backing cylinders 38, inner shaft 34, anchor plugs 40 and grip ends 44, rotates as a unit.

Referring now to FIG. 9, it will be seen that operating handle 32 is constructed with a pair of shear sections, indicated generally at 51, located adjacent the control handle casing 26. Each shear section is formed by providing an annular groove in the exterior surface of inner shaft 34. The portion of the inner shaft underlying the annular grove is carefully proportioned to provide sufficient strength for normal operating conditions, but will be the first to break when the operating handle 32 makes severe contact with an obstruction, as for example a post or wall. The provision of such shear sections prevents damage to the delicate mechanisms housed within casing 26 or jamming of the speed controls in an operative position which might occur if the operating handle broke within the casing. To prevent longitudinal movement of the operating handle, a snap ring 52 is positioned in the annular groove and is supported by thrust washer 54. Sufficient clearance for relative movement is provided between the parts. By this construction, a sharp blow to the hand grips 36 will cause breakage of the operating handle only at one of the shear sections. After such an occurrence, the damaged inner shaft 34, which is the sole breaking part, can be withdrawn and replaced with a new inner shaft, thus obviating the need to replace any other component.

The operating handle 32 has two hand grips 36, both of which are locked to inner shaft 34 by pins 56 so that all three parts rotate as a unit in either direction. To provide a means by which the operating handle is automatically returned to its neutral or off position in which the traction motor is de-energized, a coiled spring 58 is slidably carried about inner shaft 34 within control handle housing 26. Collar 62 is mounted about the periphery of inner shaft 34 adjacent to the coiled spring 58 by means of bolt 63. A radial extension of collar 62 has a longitudinally extending collar finger 60 projecting therefrom which is parallel to inner shaft 34 and extends toward coiled spring 58. The spring tips 65 and 67 of coiled spring 58 are curved around collar finger 60 as shown in FIG. 8. An arresting arm 64 is mounted in lower casing portion 66 and extends inwardly therefrom immediately below collar finger 60 (when in its neutral position) and parallel thereto. The spring tips 65 and 67 of coiled spring 58 are curved downwardly to also embrace arresting arm 64.

Rotation of hand grips 36 in either direction causes inner shaft 34, its associated collar 62 and collar finger 60 to revolve as a unit. By this action one spring tip of coiled spring 58 is contacted by and carried with collar finger 60. The other spring tip is held in place by arresting arm 64. The extent of angular rotation of collar finger 60 is limited by the presence of casing shoulders 68 and 70 which are integral with and project inwardly from control handle lower casing portion 66 as shown in FIG. 8.

Thus, when handle grips 36 are released by the operator, collar finger 60 is urged toward the neutral position by coiled spring 58, the spring tips of which have been biased apart by separation between collar finger 60 and arresting arm 64. This described cooperative relationship between collar finger 60, arresting arm 64, coiled spring 58 and casing shoulders 68 and 70 permits the operating handle 32 to be revolved a definite distance in either direction and to be positively returned to the neutral position when angular pressure on the hand grips 36 is released or relaxed.

Referring now to FIGS. 4 and 5, it will be seen that cam plate 72, which is curved so as to conform to the outer periphery of inner shaft 34, has two elongated bolt holes 74 located therein to receive mounting bolts 76 which threadably secure cam plate 72 to inner shaft 34. Bolt holes 74 are elongated to facilitate accurate longitudinal positioning of cam plate 72 on inner shaft 34. Formed as integral portions of cam plate 72 are two oppositely disposed cam shoulders 78 and 80. These cam shoulders are located at the margins of cam plate 72 and, as can be seen in FIG. 4, cam shoulder 78 slopes upwardly from the longitudinal center line of cam plate 72, reaches its apex and then slopes downwardly to terminate at the cam plate edge. Cam shoulder 80 is similarly shaped but is mounted adjacent the other margin in a reversed position. Cam plate 72 is bolted to operating handle 32 and is rotatable therewith in either direction.

A double bank of switches generally designated as 82 is shown in FIGS. 3, 4, 6 and 7. The two banks are identical, one controlling the forward operation of the motor and the other controlling the reverse operation. Only one switch bank will therefore be described. The switches are blade type and are made from an electrically conductive metal such as copper. Referring now to FIG. 7, it will be seen that switch blades 84, 86, 88, 90 and 92 are stacked vertically and are attached to base plate 94 by two retaining bolts 96 which run vertically through the stack. Insulated spacers 98 are inserted between each switch blade and are carried by the bolts to space the blades apart and to insulate them from each other. Each switch blade has mounted on its forward tip, opposite the blade portion through which retaining bolts 96 pass, a contact member having upper and lower contact surfaces. The contact members are respectively numbered 100, 102, 104, 106 and 108, and are positioned in vertical alignment slightly spaced apart. Extending from the bolt end of each switch blade are dual terminals 110 having apertures located therein adapted to receive electrical lines 111 (shown in part) which are led from the traction drive housing 14 up through conduit 143 which is carried within steering bar 22.

A cam roller assembly, generally designated as 112, is mounted beneath contact member 108 of switch blade 92 and is shown in detail in FIG. 7a. U-shaped bracket 114 is affixed to lowest switch blade 92 and carries transverse axle 116 about which roller 118 is free to revolve. Cam roller assembly 112 is insulated from contact member 108 and is adapted to be cammed in a vertical direction while rolling upon cam shoulder 78. It will be seen in FIG. 6 that the two banks of switches 82 are fixed in position side by side and are identical in every respect.

Referring now in particular to FIG. 4, the operation of a bank of switches 82 will now be described. By rotating hand grips 36, which are fixed to inner shaft 34, in a counter-clockwise direction, cam shoulder 68 is brought into contact with roller 118 which rolls along the cam shoulder while being vertically raised. Roller 118 is attached to switch blade 92 and in raising causes contact member 108 to move upwardly to close with contact member 106. It will be seen that as the operating handle 32 is revolved further in a counter-clockwise direction, roller 118 is raised still higher thereby causing each contact member to sequentially make contact with the next higher contact member. By this arrangement, the operator can selectively choose the number of electrical circuits to be closed by varying the angle of rotation of hand grips 36.

Referring now to the schematic diagram shown in FIG. 12, the relationship between the above-described switch blade operation and the motor speed control circuit will be explained. When the operating handle is in its neutral position and all contact members are spaced apart, the traction motor is inoperative because of the open circuits across solenoid 1 and across the open switches. Furthermore, the shaft of the traction motor is braked if the operating handle 32 is released. This is accomplished by means of a conventional so-called "dead man brake" which is applied when the steering bar 22 springs to the brake position shown in phantom in FIG. 1.

It will be seen that when operating handle 32 is first rotated in counter-clockwise direction, the lower contact member $K_c$ is cammed upwardly until it strikes the next higher contact member $K_1$. This action closes a circuit which energizes coil $A_1$ of plunger-type solenoid 1. This causes core plunger $P_1$ to be drawn up into the coil and against terminals $T_1$ and $T_2$. This closes the main circuit in which the battery, traction motor, and resistances $R_2$ and $R_3$ are linked in series. The traction motor in this circuit condition operates at a slow or idle speed to drive steerable wheel 16 through a conventional gear linkage system.

As the operating handle is further turned in a counter-clockwise direction, contact members $K_c$ and $K_1$ (which remain in engagement) are lifted by the camming action of the cam shoulder 78 until contact is made with the next higher contact member $K_2$. This closes the circuit which energizes coil $A_2$ in solenoid 2 to pull plunger $P_2$ across terminals $T_3$ and $T_4$. Since solenoid 2 is in parallel with resistance $R_2$, the current across $R_2$ is effectively short-circuited through the solenoid thus allowing the traction motor to increase to medium speed.

Continued rotation of the operating handle causes all four contact members to be brought into engagement thereby shorting out resistance $R_3$ in addition to resistance $R_2$. In this final condition, the traction motor further speeds up to run at high speed. For purposes of illustration, only two main circuit resistances and associated solenoids are shown. However, it should be understood that additional resistances and solenoids could be placed in the circuit and controlled by additional stacked switch blades and contacts. In fact, the preferred embodiment of FIGS. 3 and 7 shows five switch blades which necessitates the provision of three resistances in the main circuit.

Referring now to FIG. 3 and to FIGS. 10 and 11, the latter being sections taken through FIG. 3, it will be seen that the control handle casing 26 is securely mounted upon steering bar 22 by a means which is novel and comprises a separate invention which is the subject of our co-pending application Serial No. 367,839, filed May 15, 1964. A brief description of this invention is herewith given. Steering bar 22 is preferably constructed of steel or some other structurally rigid material and is formed with a rectangular cross-section having relatively thin walls. Control handle casing 26 has a lower casing portion 66 which is dimensioned so as to permit it to be slipped over the upper end of steering bar 22. It will be seen in FIG. 10 that lower casing portion 66 has a front wall 120, two side walls 122 and 124 and a back wall 126. Front wall 120 is provided with four bolt head recesses 128 through which carriage bolts 130 are inserted. Back wall 126 is provided with four corresponding wall openings 132 having diameters large enough for lock washers 136 and nuts 134 to pass completely therethrough and to accommodate a socket wrench (not shown) with which to tighten the nuts. Corresponding bolt holes of bolt diameter are located in the steering bar 22. To achieve a clean appearance and to prevent accidental interference with the nuts and bolt ends, a cover plate 138 is mounted over wall openings 132 of back wall 126 and maintained in position by a fastening bolt 139.

It will now be seen that the control handle lower casing portion 66 can be slipped over the upper end of steering bar 22. Four bolts 130 are then inserted through front wall 120, the walls of steering bar 22 and wall openings 132 in back wall 126. Nuts 134, together with their lock washers 136, are then threadably secured to bolts 130.

Referring to FIG. 10, it will be seen that before the nuts are tightened up, there is a small amount of clearance between the outer wall surfaces of the steering bar 22 and the inner wall surfaces of the lower casing portion 66. By using a socket wrench, nuts 134 can be tightened through wall openings 132 thereby deforming the regular rectangular configuration of the steering bar cross-section. As nut tightening progresses, steering bar wall 140, directly adjacent nuts 134, is bowed inwardly. Steering bar wall 142, adjacent the front wall 120, is pressed very firmly against the entire inner surface of the front wall 120. The deformation of the steering bar back wall 140 causes steering bar side walls 144 and 146 to flex outwardly jamming against handle casing side walls 122 and 124. This mounting construction and method creates an extremely rigid and long-lasting engagement between the control handle casing and the steering bar. Moreover, it is not necessary to machine the mating parts of this mounting construction to a close dimensional tolerance because when the bolts are tightened, looseness of fit is taken up. This feature permits a great savings to be achieved in the cost of manufacture.

Operation of the control handle

An example of the operation of the materials handling truck is the movement of a palletized load from one location to another. Such a movement would require the operator to "walk" the empty truck up to the load, maneuver the fork extensions into the pallet, raise the pallet clear from the floor, walk the loaded truck to the load destination, lower the pallet to the floor and disengage the fork extensions from the pallet. The operator can control the entire operation solely by use of control handle 24. To be specific, the operator first grasps the hand grips 36 with one or both hands. Forward or clockwise rotation of the hand grips, which turn as a unit, energizes the traction motor, housed at 14, which drives steerable wheel 16 in a forward direction. Regulating the amount of angular rotation of the hand grips determines the speed of the truck. Rearward or counter-clockwise rotation of the hand grips causes the truck to be driven rearwardly.

To raise or lower the fork extensions 18, the operator pushes the appropriate buttons 30 which cause the fork wheels 20 to pivot downwardly. This horizontally raises the fork extensions.

It should be noted that the control buttons 30 are located next to hand grips 36 so that the operator can either rotate the hand grips with one hand and push control buttons 30 with the other or place both hands on hand grips 36 and operate the buttons with his thumbs. This arrangement makes for faster and safer truck operation.

In order to steer the moving truck, the operator swings control handle 24 in a horizontal arc. The control handle is mounted on steering bar 22 which is directly linked to steerable wheel 16.

The operation of the motor speed control mechanism housed in control handle casing 26 will now be described in detail. To cause the truck to move in a forward or rearward direction, the operating handle 32 is rotated. This action cams the contact members of the affected bank of switches into engagement thereby energizing the traction motor and selectively adjusting the speed thereof. More specifically, rearward or counter-clockwise rotation of operating handle 32 brings cam shoulder 78 into contact with the roller 118 of roller assembly 112. Contact member 108 is cammed upwardly into engagement with contact member 106 to energize the traction motor by means of solenoid actuation. Continued counter-clockwise handle rotation sequentially closes contact members 104, 102 and 100. Each switch closure short circuits a resistance across its associated solenoid terminals. As each resistance is short circuited, the speed of the traction motor increases.

If the operator relaxes or removes his hands from hand grips 36, the inter-action of collar finger 60, arresting arm 64 and coiled spring 58 returns the operating handle 32 to the neutral or off position in which the traction motor is de-energized. Rotating hand grips 36 in the clockwise direction causes cam shoulder 80 to contact the second bank of switches whereby the traction motor is driven forward at controlled speeds in a manner identical to that just described for the reverse operation.

It will thus be seen that the progressive turning of operating handle 32 allows the operator to selectively drive the materials handling truck at the desired speed and also to quickly change the direction of travel by simple counter-rotation of hand grips 36. It is also important to note that if the operator's hands accidentally release hand grips 36, the spring loaded steering bar 22 raises to the upper brake position in which the traction motor is de-energized and braked. It will furthermore be seen that if the control handle 24 strikes an obstruction during the movement of the materials handling truck with sufficient force to cause breakage thereof, this breakage will occur in one of the shear areas shown in detail in FIG. 9. The inner shaft 34 will break at a point beneath snap ring 52 to prevent damage to the interior switching mechanisms within casing 26.

Obviously many modifications and variations of the present invention are possible in the light of the above teachings. Therefore, it is to be understood that the invention is not limited in its application to the details of the construction and arrangement of parts specifically described or illustrated, and that within the scope of the appended claims, it may be practiced otherwise than as specifically described or illustrated.

We claim:
1. In a materials handling truck, a steering bar; a control switch casing mounted on the free end of said steering bar; an operating handle extending transversely through said casing and mounted for rotation in either direction about its longitudinal axis; spring means engaging said operating handle and said casing for biasing said handle toward a neutral position; a camming plate affixed to the circumference of said operating handle within said casing, said camming plate having two raised cam surfaces formed thereon, said cam surfaces longitudinally and circumferentially spaced apart relative to said operating handle; two banks of blade switches having stacked normally spaced apart contact elements, said blade switch banks mounted on the interior of said casing; a cam follower affixed to each said blade switch bank, each said cam follower biased against one of said cam surfaces whereby rotation of said operating handle in one direction progressively closes the contact elements in one of said switch banks and rotation of said operating handle in the other direction progressively closes the contact elements in the other of said switch banks.

2. Apparatus of claim 1 further characterized by; a pair of grooved circumferential areas in said operating handle, said areas located adjacent the exterior of said control switch casing and having lesser structural strength than the remainder of said operating handle whereby the grooved portions will break when the handle strikes an obstruction with force sufficient to otherwise break the handle within the casing and damage the switch bank therein.

3. Apparatus of claim 1 further characterized by; control buttons for truck loading operations mounted upon the exterior surface of said control switch casing adjacent said operating handle whereby the operator can activate the control buttons while maintaining his hands upon the operating handle.

4. A control handle for use in a materials handling truck comprising; a support bar; a control handle casing mounted upon the upper end of said support bar; an operating handle extending transversely through said casing and mounted for rotation about its own longitudinal axis; spring return means for biasing said operating handle to a neutral position; two cams mounted on said operating handle within said casing, said cams being spaced apart and extending upwardly from said operating handle; two blade switch banks located adjacent said two cams and mounted on said casing, each said switch bank having stacked contact elements positioned whereby rotation of said operating handle in one direction progressively cams and closes one bank of stacked contact elements and rotation of said operating handle in the other direction progressively cams and closes the other bank of stacked contact elements; grooved peripheral areas in said operating handle located adjacent said casing, said grooved areas having structural strength less than the other portions of said operating handle whereby contact between the operating handle and an obstacle will cause the operating handle to break at one of the grooved areas instead of within the handle casing; and control buttons mounted upon said casing adjacent the portions of said operating handle extending without said casing whereby an operator can activate the control buttons while maintaining his hands upon the operating handle.

References Cited by the Examiner
UNITED STATES PATENTS

| | | | |
|---|---|---|---|
| 1,930,117 | 10/33 | Yutzler | 200—157 |
| 1,969,926 | 8/34 | Eickhoff | 200—153 |
| 2,790,879 | 4/57 | Ulinski | 200—157 |

BERNARD A. GILHEANY, *Primary Examiner.*